No. 725,849. PATENTED APR. 21, 1903.
H. R. KEITHLEY.
FREIGHT CAR.
APPLICATION FILED DEC. 17, 1902.
NO MODEL. 3 SHEETS—SHEET 1.
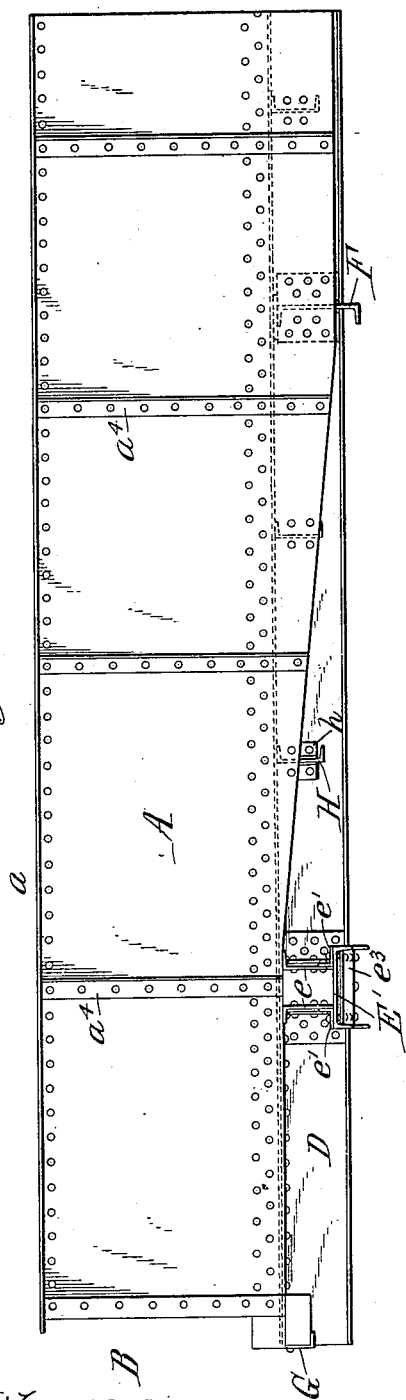
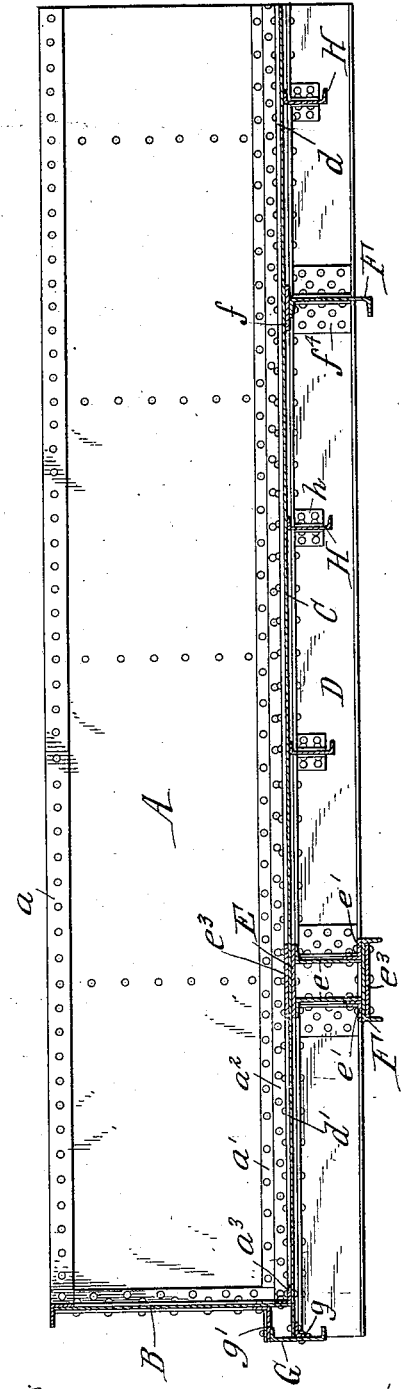

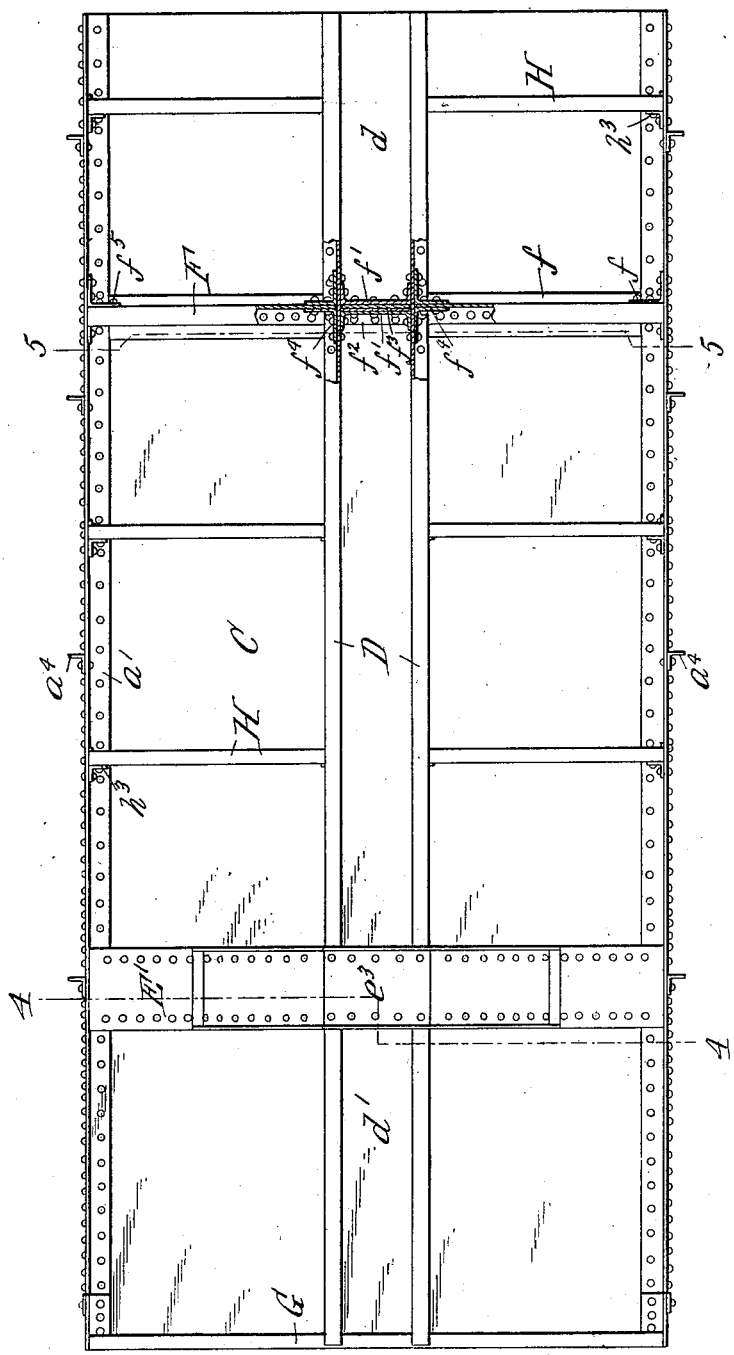

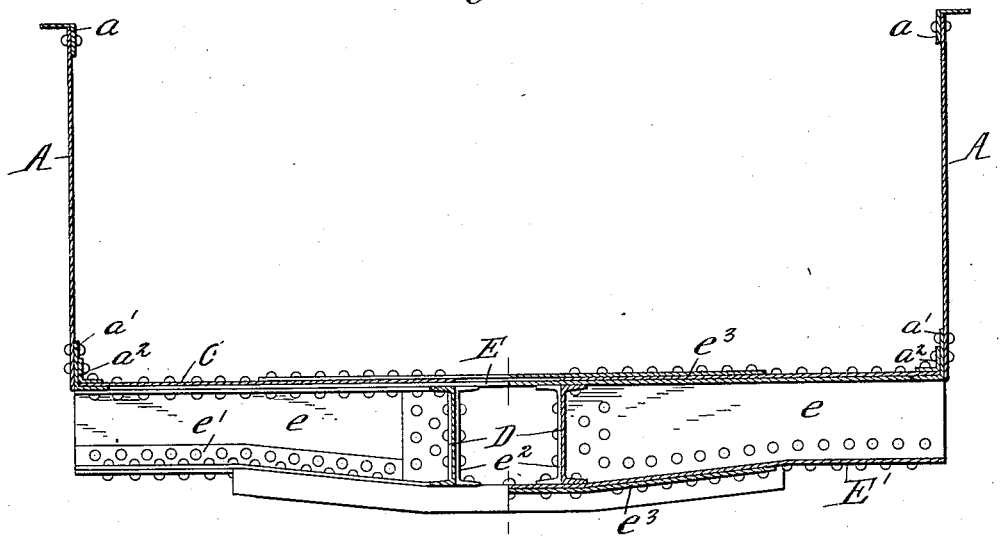
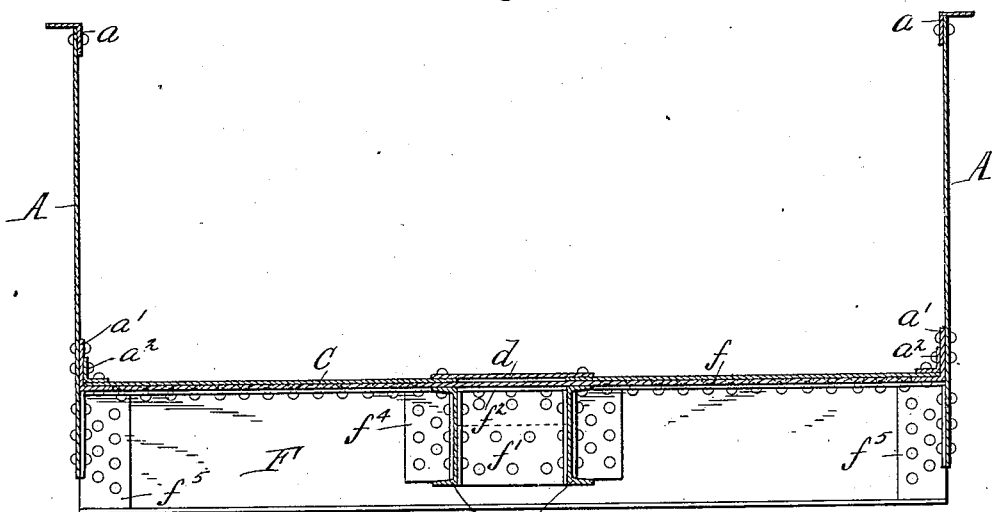
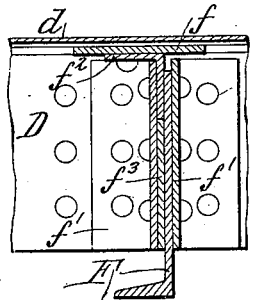

UNITED STATES PATENT OFFICE.

HERBERT R. KEITHLEY, OF BUFFALO, NEW YORK.

FREIGHT-CAR.

SPECIFICATION forming part of Letters Patent No. 725,849, dated April 21, 1903.

Application filed December 17, 1902. Serial No. 135,486. (No model.)

*To all whom it may concern:*

Be it known that I, HERBERT R. KEITHLEY, a citizen of the United States, residing at Buffalo, in the county of Erie and State of New York, have invented new and useful Improvements in Freight-Cars, of which the following is a specification.

This invention relates to a metal railway-car which is built up of ordinary commercial rolled shapes and plates, and more especially to a gondola car.

The object of the present invention is to produce a light and strong gondola car which is composed of few parts and has great carrying capacity and great strength and rigidity to withstand the shocks and strains to which it is subjected in use.

In the accompanying drawings, consisting of three sheets, Figure 1 is a side elevation of one-half of a gondola-car body embodying the invention. Fig. 2 is a longitudinal vertical section in line 2 2, Fig. 3. Fig. 3 is a bottom plan view thereof. Figs. 4 and 5 are transverse vertical sections, on an enlarged scale, in lines 4 4 and 5 5, Fig. 3, respectively. Fig. 6 is a detail sectional view, on an enlarged scale, showing the lower portion of the plate-girder side and floor connection. Fig. 7 is an enlarged detail section of the transom, showing the manner of connecting the same with the center sills.

Like letters of reference refer to like parts in the several figures.

The car-body is composed of vertical sides and ends connected by a horizontal floor or bottom. The sides, which are in the form of plate-girders, are supported by bolsters arranged in the usual relation and carry the main part of the load of the car between the bolsters. Two longitudinal center or draft sills are employed, which while they supplement the plate-girder sides and carry a portion of the load on each side of the two bolsters are comparatively light beams and chiefly intended to resist and transmit the draft strains and buffing shocks. The web-plates of the plate-girder sides extend down below the floor-line and below the lower or tension flanges of the girders between the bolsters and are connected together and to the center sills by transverse transoms, which serve to distribute the load and stresses from the center sills to the plate-girder sides.

A represents the longitudinal sides of the car, B the ends, and C the horizontal floor or bottom, which connects the sides and ends of the car. Each side is in the form of a built-up plate-girder, having a vertical web plate or plates and upper and lower or compression and tension flanges formed by angle-bars riveted to the web-plate. The upper flange $a$ preferably projects outwardly from the web-plate. The lower or tension flange of the side girder comprises an angle-bar $a'$, which is riveted to the inner face of the girder web-plate and extends horizontally from end to end of the girder, with its inwardly-projecting horizontal flange in a plane above the tops of the body-bolsters, so as to rest thereon to support the girder. The horizontal flanges of the tension-angles lie in a plane below, extend beneath, and form the support for the car-floor. The floor and its load thus rest directly on the horizontal flanges of the tension-chords and the connection is stronger than if the floor extended beneath the flanges and was carried by the heads of the rivets securing it to the tension-chords. Besides the angles $a'$ other angles $a^2$ are employed, which are arranged on top of the floor and riveted to the floor, angles $a'$, and sides of the car. These angles $a^2$ supplement the angles $a'$ and increase the metal section and consequently the strength of the tension-chords. The upper angles $a^2$ also cover the spaces between the floor and sides of the car and prevent moisture, acids, &c., from finding their way to the lower tension-angles $a'$ and corroding the latter. The ends of the floor are secured to the end walls of the car by the usual angles $a^3$ or in any other suitable manner. The web-plates of the sides are deepened or have integral extensions between the body-bolsters, which project down below the tension-chords and floor-level. There are no flanges or angles at the lower edges of these web-plate extensions. $a^4$ represents upright web-stiffeners, which are riveted to web-plates of the girder sides and extend from the upper flanges to the lower edges of the girder-webs and web extensions.

D D represent longitudinal center or draft and buffing sills, which are arranged in their usual relation beneath the floor midway between the sides. The sills are preferably formed of channel-beams, which extend from end to end of the car and are arranged with their webs vertical and their flanges projecting horizontally outward. The center sills are connected by top plates $d$ $d'$, which are arranged on the upper surface of the floor and are riveted to the sections of the latter and to the upper flanges of the center sills. The plate $d$ extends from one bolster to the other and the plates $d'$ from the bolsters to the ends of the car. These plates serve to cover the longitudinal space between the sections of the floor, which is divided longitudinally beneath the plates $d'$.

The bolsters, which are arranged in their usual relation near the ends of the car, are connected rigidly to the center sills and project at their ends beneath the lower inwardly-projecting tension-flanges of the plate-girder sides to support the latter. Each bolster (see Figs. 2 and 4) is composed of upper and lower or tension and compression members E E', which extend continuously or unbroken from one end to the other of the bolster, respectively above and below the center sills, and vertical members $e$, which connect the upper and lower members between the center sills and ends of the bolster. In the construction shown the tension member E is in the form of a plate arranged below the car-floor. The floor being longitudinally divided is not relied on to resist the tension stresses in the bolster. The compression member E' is formed by a channel-beam arranged with its flanges extending downwardly, the end portions of the flanges being preferably removed. The vertical connecting members are formed of channel-beams having their lower flanges removed. They are secured to the compression member by angles $e'$ and are connected to the tension member of the bolster by rivets passing through their upper flanges. This construction enables the ends of the bolster to be made of less depth than the center portion, and as the side girder rests on the upper integral flanges of the vertical channels the load is supported directly by these flanges and is distributed direct to the channel-webs, thereby avoiding excessive sheering stresses concentrated on a few rivets which would result from using riveted angles instead of the integral channel-flanges. The connection of the bolster and center sills is preferably strengthened and the bolster stiffened centrally by short channel-beams $e^2$, arranged inside of and against the center sills, and plates $e^3$, riveted, respectively, to the upper and lower faces of the tension and compression members of the bolster.

Transverse transoms extend across the car between the bolsters and are securely connected at their opposite ends to the depending web-plate extensions of the girder sides. One of the transoms is shown in the drawings at F. It consists, preferably, of a channel-beam of greater depth than the center sills arranged with its web vertical and flanges horizontal. The transom-web is provided with openings through which the center sills pass, and the upper flange of the transom-channel between the center sills is removed.

$f$ represents a flat bar or plate which is riveted to the upper flange of the transom and extends from the tension-flange of one girder side to the other, forming a continuous upper compression-flange for the transom. The transom and center sills are securely connected at their point of intersection preferably in the manner shown in the drawings, which is as follows: $f'$, Figs. 5 and 7, represents channel-pieces between the center sills having their flanges riveted to the latter and their webs riveted to the webs of the transom. $f^2$ is a horizontal angle-plate between the center sills and having its flanges riveted to the webs of the transom and channel-pieces $f'$ and to the bar $f$ on the upper flange of the transom. A filler-plate $f^3$ is interposed between the transom-web and one channel-piece below the horizontal angle-plate. $f^4$ represents vertical angle-plates arranged outside of the center sills and riveted to the latter and to the transom. The ends of the transom are rigidly connected to the depending web-plate extensions of the girder sides by angle-plates $f^5$, riveted to the transom and web-plate extensions, or in any other preferred manner. The transoms support the center sills between the bolsters and distribute the floor load directly from the center sills to the plate-girder sides.

Each end sill, as shown in Fig. 2, is preferably constructed as follows: G represents a channel-beam arranged with its web vertical and flanges extending inwardly. The channel-beam is connected to the end of the car-floor, which projects beyond the end wall of the car, by an angle-bar $g$. The upper flange of the channel-beam is connected to the end wall by an angle-bar $g'$.

H represents transverse floor-beams, preferably channel-beams, which extend from the depending web-plate extensions of the plate-girder sides to the center sills between the bolsters and transoms. They are connected to the webs of the center sills and to the web-plate extensions of the sides by angle-plates $h$.

I claim as my invention—

1. In a car, the combination with body-bolsters, of plate-girder sides having lower or tension flanges located in a plane above and resting on said bolsters, and a floor arranged in a plane above and resting on said tension-flanges, substantially as set forth.

2. In a car, the combination with body-bolsters, of plate-girder sides having lower or tension flanges formed by angle-bars riveted to the web-plates of the girder sides, said flanges being located in a plane above and resting on said bolsters, and a floor arranged in a plane above and resting on said tension-flanges, substantially as set forth.

3. In a car, the combination with body-bolsters, of plate-girder sides having lower or tension flanges located in a plane above and resting on said bolsters, and a floor arranged in a plane above and resting on said tension-flanges, the web-plates of said girder sides extending below said tension-flanges, substantially as set forth.

4. In a car, the combination with body-bolsters, of plate-girder sides having lower or tension flanges located in a plane above and resting on said bolsters, a floor arranged in a plane above and resting on said tension-flanges, the web-plates of said girder sides extending below said tension-flanges, and transoms extending beneath the floor and having their opposite ends secured to said web-plate extensions of the girder sides, substantially as set forth.

5. In a car, the combination of bolsters, plate-girder sides supported by said bolsters and having parallel compression and tension flanges and web-plate extensions depending below said tension-flanges between the bolsters, and continuous transverse transoms secured at their ends to said web-plate extensions of the plate-girder sides, substantially as set forth.

6. In a car, the combination of bolsters, plate-girder sides supported by said bolsters and having parallel compression and tension flanges, and web-plate extensions depending below said tension-flanges between the bolsters, said tension-flanges projecting inwardly, a floor supported by and secured to said tension-flanges, and continuous transverse transoms secured at their ends to said web-plate extensions of the plate-girder sides, substantially as set forth.

7. In a car, the combination of plate-girder sides having parallel compression and tension flanges and web-plate extensions depending below said tension-flanges, said tension-flanges consisting each of two angle-bars, a floor, the side edges of which extend between the angle-bars forming the tension-flanges, and rivets connecting said flange-angles together and to said floor, substantially as set forth.

8. In a car, the combination of plate-girder sides, transoms formed of flanged beams secured at their opposite ends to said girder sides, center sills which extend from end to end of the car and pass through openings in the webs of said transoms, and plates connecting said center sills and transoms, substantially as set forth.

9. In a car, the combination of plate-girder sides, transoms formed of channel-beams having unbroken lower flanges and secured at their opposite ends to said girder sides, center sills which extend from end to end of the car and pass through openings in the webs of said transoms, and plates connecting said center sills and transoms, substantially as set forth.

10. In a car, the combination of plate-girder sides, center sills extending from end to end of the car, transoms formed of flanged beams secured at their opposite ends to said girder sides, said transoms having openings in their webs through which said center sills pass, and plates riveted to the upper flanges of the transoms and extending across said center sills, substantially as set forth.

11. In a car, the combination of center sills and a bolster which is of greater depth at its central than at its end portions and which comprises a continuous lower member extending from end to end of the bolster below the center sills, and a continuous upper member extending from end to end of the bolster above the center sills, and vertical members connecting said upper and lower members at opposite sides of said center sills and having integral upper flanges riveted to said upper plate, and side girders which are supported on said upper flanges of said vertical members, substantially as set forth.

12. The combination with the end wall of a car and the bottom projecting beyond said end wall, of a channel-beam arranged with its web vertical and connected to the projecting end of said bottom and its flanges extending horizontally, and an angle-bar secured to the upper flange of said channel-beam and to the said end wall, substantially as set forth.

13. The combination of side-supporting members, and a continuous transom connecting said side-supporting members and consisting of a flanged beam having an unbroken lower flange, and being slotted for the passage of center sills, and a plate secured to the upper flange of said transom-beam, substantially as set forth.

14. A transom consisting of a channel-beam which is slotted for the passage of a longitudinal sill and has a continuous or unbroken lower flange, and a plate secured to the upper flange of said channel and crossing the slot for the longitudinal sill, substantially as set forth.

Witness my hand this 12th day of December, 1902.

HERBERT R. KEITHLEY.

Witnesses:
 JNO. J. BONNER,
 CHAS. W. PARKER.